United States Patent
Salazar

(10) Patent No.: US 9,981,281 B2
(45) Date of Patent: May 29, 2018

(54) SPRAY BOOTH WITH SHALLOW DEPTH UNDER SECTION AND WET SCRUBBER

(71) Applicant: Giffin, Inc., Auburn Hills, MI (US)

(72) Inventor: Abraham J. Salazar, Rochester Hills, MI (US)

(73) Assignee: GIFFIN, INC., Auburn Hills, MI (US)

( * ) Notice: Subject to any disclaimer, the term of this patent is extended or adjusted under 35 U.S.C. 154(b) by 4 days.

(21) Appl. No.: 14/905,419

(22) PCT Filed: Jul. 17, 2014

(86) PCT No.: PCT/US2014/047107
§ 371 (c)(1),
(2) Date: Jan. 15, 2016

(87) PCT Pub. No.: WO2015/009978
PCT Pub. Date: Jan. 22, 2015

(65) Prior Publication Data
US 2016/0158787 A1    Jun. 9, 2016

Related U.S. Application Data

(60) Provisional application No. 61/847,177, filed on Jul. 17, 2013.

(51) Int. Cl.
*B05B 1/28* (2006.01)
*B05B 15/12* (2006.01)

(52) U.S. Cl.
CPC .......... *B05B 15/1281* (2013.01); *B05B 14/43* (2018.02); *B05B 14/468* (2018.02); *B05B 16/60* (2018.02); *Y02P 70/36* (2015.11)

(58) Field of Classification Search
USPC ...... 118/326, 308, 309, DIG. 7; 55/DIG. 46; 454/49–55
See application file for complete search history.

(56) References Cited

U.S. PATENT DOCUMENTS

| | | |
|---|---|---|
| 5,040,482 A | 8/1991 | McGuire et al. |
| 5,746,650 A | 5/1998 | Johnson et al. |
| 6,024,796 A | 2/2000 | Salazar et al. |
| 6,093,250 A | 7/2000 | Salazar et al. |
| 2002/0189449 A1 | 12/2002 | Klobucar et al. |
| 2005/0170768 A1 | 8/2005 | Kelly |

FOREIGN PATENT DOCUMENTS

JP    2001-025692 A    1/2001

OTHER PUBLICATIONS

PCT International Search Report—dated Oct. 30, 2014.

*Primary Examiner* — Yewebdar T Tadesse
(74) *Attorney, Agent, or Firm* — Brinks Gilson & Lione

(57) ABSTRACT

A spray booth module having a plurality of wet scrubbers. The wet scrubbers being located beneath an area where over spray is generated and enabling the under section exhibits a reduced vertical depth relative to known under sections of comparable spray booths.

14 Claims, 16 Drawing Sheets

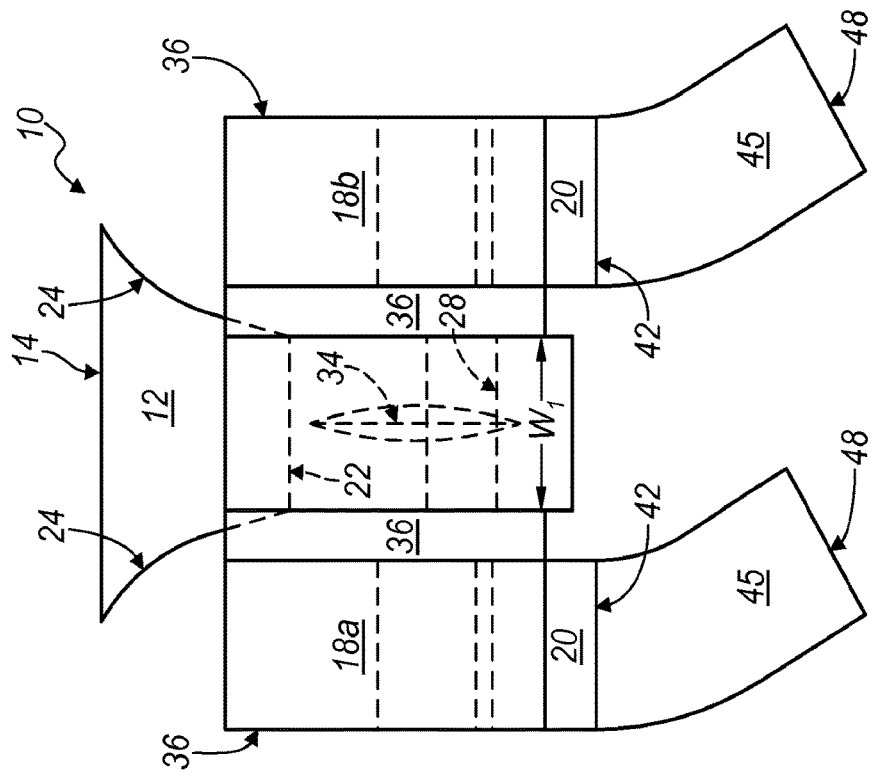
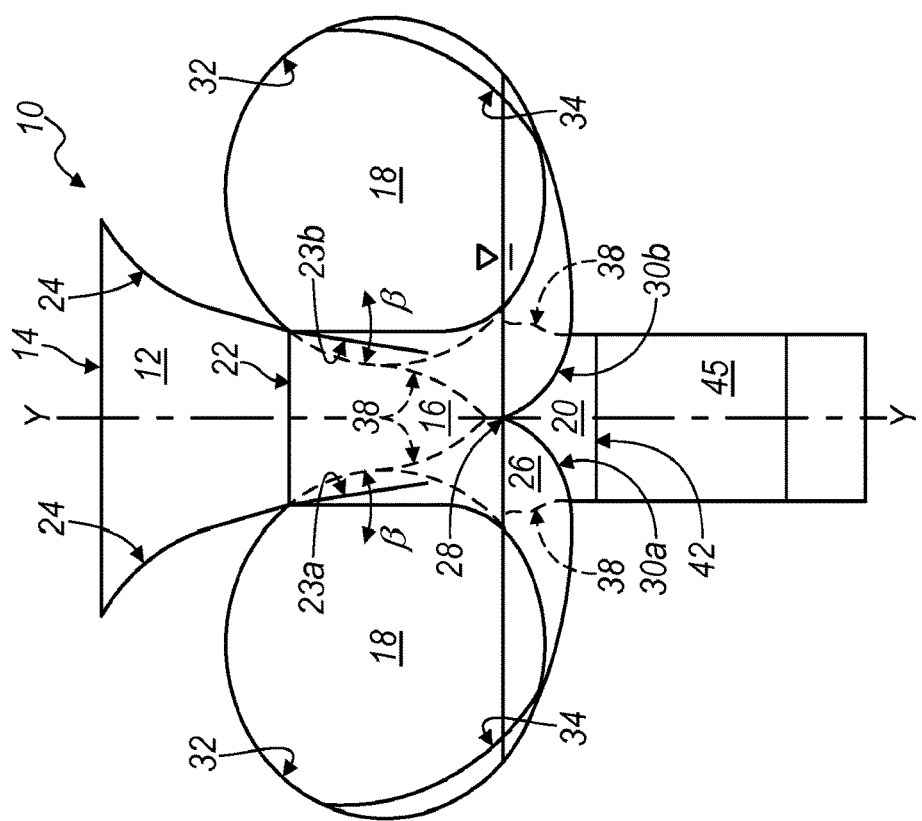
FIG. 3B
FIG. 3A

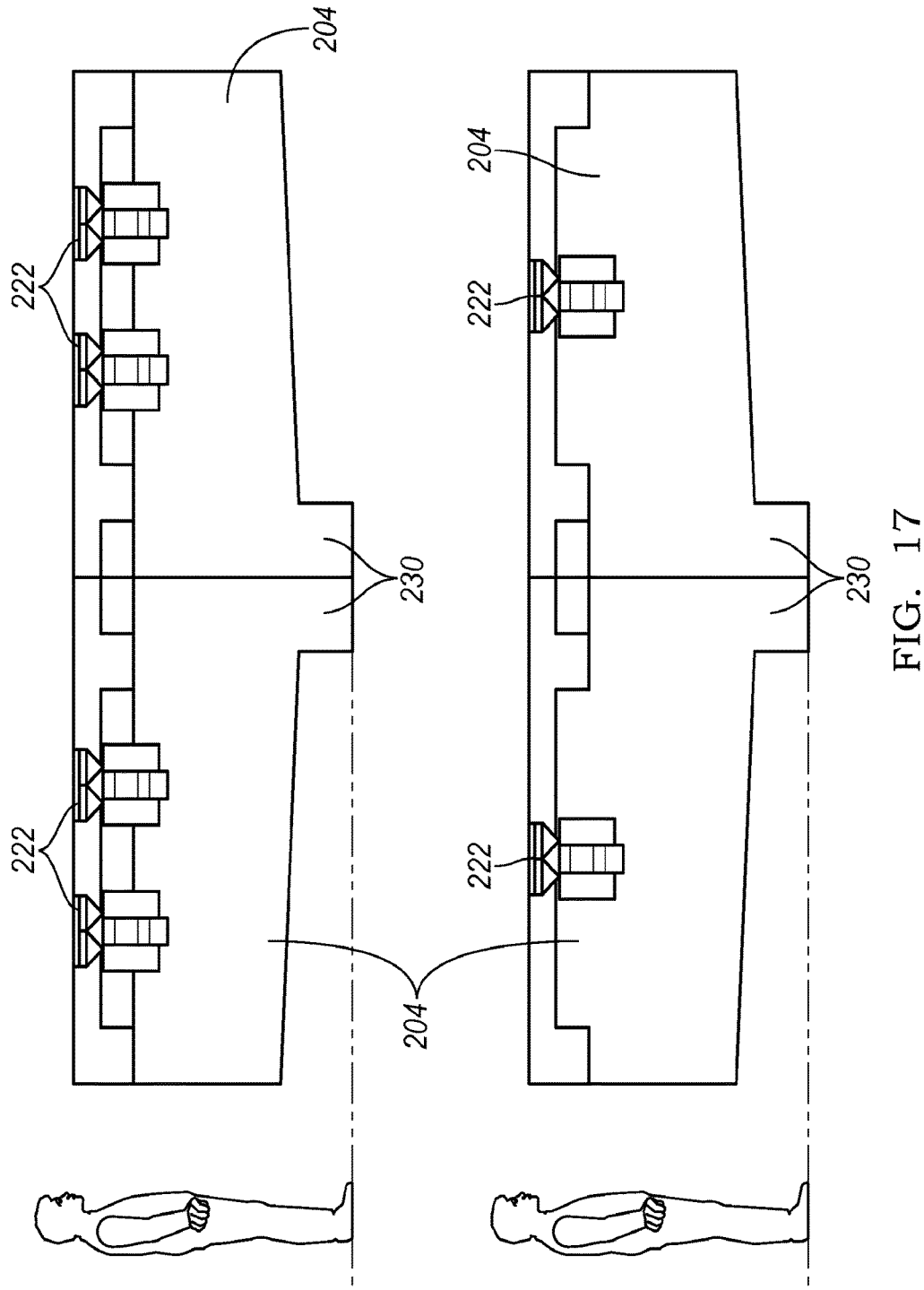

SPRAY BOOTH WITH SHALLOW DEPTH UNDER SECTION AND WET SCRUBBER

BACKGROUND

1. Field of the Invention

The present invention generally relates to spray booths. More specifically, the invention relates to air handling in connection with a paint spray booths.

2. Description of Related Art

Many industrial processes require the application of fluid to a material. For instance, applying a surface coating (e.g. paint) to an object requires fluid, such as a liquid or powder slurry, to be sprayed or otherwise delivered to the material. Typically, this fluid application will occur in a contained environment that enables control of the fluid. For example, paint is often applied in a paint spray booth that allows control of the atmospheric conditions and containment of the paint. Inherent in the paint spraying process is overspray. Overspray is paint that does not adhere to the object being painted and floats in the air as a mist. In order to provide a safe working environment and a high quality finished product, paint spray booths require a substantially continuous supply of clean, fresh air. This clean, fresh air also assists with discharge of the overspray from the spray booth.

Various configurations of spray booths have been developed for different fluid application processes and discharge of the overspray. These booths are often classified by the direction of the airflow in the spraying area. For instance, cross-draft booths include an airflow that moves parallel to the floor from behind the operator toward a dry filter or a water curtain. Downdraft booths have an airflow which moves from the ceiling vertically downward to an exhaust system located below the floor. Semi-downdraft booths include an airflow that moves in a diagonal direction in the booth towards an exhaust.

Since the overspray or paint mist contains paint particles, it is important to filter or otherwise clean this air before discharging it back into the environment. Several methods have been developed for separating the paint mist from the air exhaust stream. For instance, a dry method results in air entrained with paint being forced through a dry filter or screen that absorbs or otherwise captures the paint particles. A wet method requires the air entrained with paint to contact and be mixed with another fluid, such as water, so that the paint particles are captured by the fluid.

Due to the large amount of paint used by most industrial paint facilities, such as automotive plants, the wet method in a downdraft booth is the preferred configuration. These booths generally have a wet scrubber that captures the fluid overspray and assists with separating the paint particles from the air.

Over time, various configurations of wet scrubbers have been developed in an attempt to increase the efficiency of the particle separation and to minimize operating costs for the paint facility. Such systems have included gravity based systems where paint laden airflow is made to pass through a bulk liquid, downwardly spilling systems where the airflow passes through a film formed from the liquid, spray systems where the airflow passes through a spray of the liquid and restriction systems where the airflow and the liquid pass through a restriction or Venturi to accelerate the air, generate turbulence, and break-up the supply water (or the capturing fluid) running along its walls. With the latter system, the water is broken-up into small drops that capture or trap the paint particles in the exhaust air within the droplets. Another type of wet scrubber utilizes an elongated tube whereby water flows downward along the walls of the tube and into a pool of liquid contained within a capturing chamber. A nozzle is positioned at the tube's exit to generate turbulence in both the water flow and exhaust air, resulting in the paint particles in the air being captured or trapped within the water.

Still other scrubber designs may utilize a vortex chamber, alone or in combination with one of the other types of scrubbers. In a vortex chamber, the particle laden air flow is introduced into a vortex chamber, follows a spiral path to the center of the chamber where it proceeds upward and out of the chamber. The paint particles are capture by water that is either sprayed outward within the vortex chamber or introduced to the airflow in a Venturi type scrubber system before introduction of both the air and the water into the vortex chamber. The spiral path within the vortex chamber causes the heavier paint laden water droplets to slow along the exterior of the vortex chamber and collect at the bottom thereof, where they are removed. Like the venturi and tube scrubbers mentioned above, scrubbers utilizing vortex chambers of the previously discussed style also have an extensive height and therefore require a significant depth beneath the paint spray chamber.

Although these designs capture and separate some of the paint particles from the air, they use a large amount of energy and/or allow a sub-optimal amount of paint particles to pass through the system and be exhausted to the outside air. Additionally, each of the above style of scrubbers have an extensive height and therefore require a significant vertical depth beneath the paint spray chamber.

A paint spray system that might incorporate the previously mentioned types of wet scrubbers is generally shown in FIG. 1. As seen therein, the under section U beneath the spray chamber C requires a significant vertical height to accommodate a scrubbers S of the above mentioned variety. An under section U may therefore have a height of about 11'3", as identified in the FIG. 1, while the vertical height from the floor grating of the spray chamber may be about 14'9", and the vertical height from the floor grating of the spray chamber to a wet floor associated with the scrubber may be about 3'6". The above recited dimensions are typical and only provided for illustrative purposes and to provide some context in connection with the vertical needed beneath the spray chamber C in order to accommodate a wet scrubber S. In actual practice, these heights may be more or less than those recited, although not drastically different, particularly with regard to being less.

The vertical height required for the under section significantly contributes to the overall cost of the paint spray booth. Additionally, an older system is being retrofitted may require significant digging costs to enable the retrofit.

SUMMARY

In overcoming the drawbacks and limitations of the known technology, the present invention provides a spray booth module comprising: a spraying section where a sprayed fluid is directed toward an object to be sprayed; a capturing section communicating with the spraying section and including at least one wet scrubber for capturing overspray of the sprayed fluid; and an under section, the under section being a portion of the capturing section and having the at least one wet scrubber provided therein, the wet scrubber being located beneath an area where over spray is generated, and wherein the under section exhibits a reduced vertical depth relative to known under sections of comparable spray booths.

In another aspect of the invention, the wet scrubber is positioned in an area located laterally outward of the object to be sprayed.

In a further aspect of the invention, wet scrubber includes an inlet, the inlet being positioned beneath an area located laterally outward of the object to be sprayed.

In still another aspect of the invention, two wet scrubbers are provided for each under section of the spray booth module.

In yet a further aspect of the invention, four wet scrubbers are provided for each under section of the spray booth module.

In an additional aspect of the invention, two wet scrubbers are provided on each lateral side of the body to be sprayed.

In another aspect of the invention, the two wet scrubbers are provided laterally adjacent to each other relative to the body to be sprayed.

In further aspect of the invention, the two wet scrubbers are provided longitudinally adjacent to each other relative to the body to be sprayed.

In another aspect of the invention, the under section has a vertical height of less than 11 feet.

In an additional aspect of the invention, the under section has a vertical height of 7 feet or less, preferably of 6 feet or less and more preferably 5 feet or less.

In still another aspect of the invention, the under section includes a two wet scrubber.

In a further aspect of the invention, two of the under sections are provided and each of the under sections includes a plurality of wet scrubbers.

In another aspect of the invention, the plurality of wet scrubbers are positioned laterally symmetrical on opposing sides of the spray booth module.

In yet another aspect of the invention, each of the wet scrubbers includes a vortex chamber.

In a further aspect of the invention, each wet scrubber includes two vortex chambers, each of the vortex chambers being located on opposing sides of an inlet into the wet scrubber.

In a still further aspect of the invention, a side wall of the under section includes a sloped upper section.

In another aspect of the invention, the under section is provided without a mist eliminator.

Further objects, features and advantages of this invention will become readily apparent to persons skilled in the art after a review of the following description, with reference to the drawings and claims that are appended to and form a part of this specification.

BRIEF DESCRIPTION OF THE DRAWINGS

FIGS. 3A and 3B are schematic frontal and side views of a wet scrubber from the paint spray booth of FIG. 2;

FIG. 17 is a schematic end view comparing the under section modules of FIGS. 13 and 14 with the under section modules of FIGS. 15 and 16.

DETAILED DESCRIPTION

Figure 2:
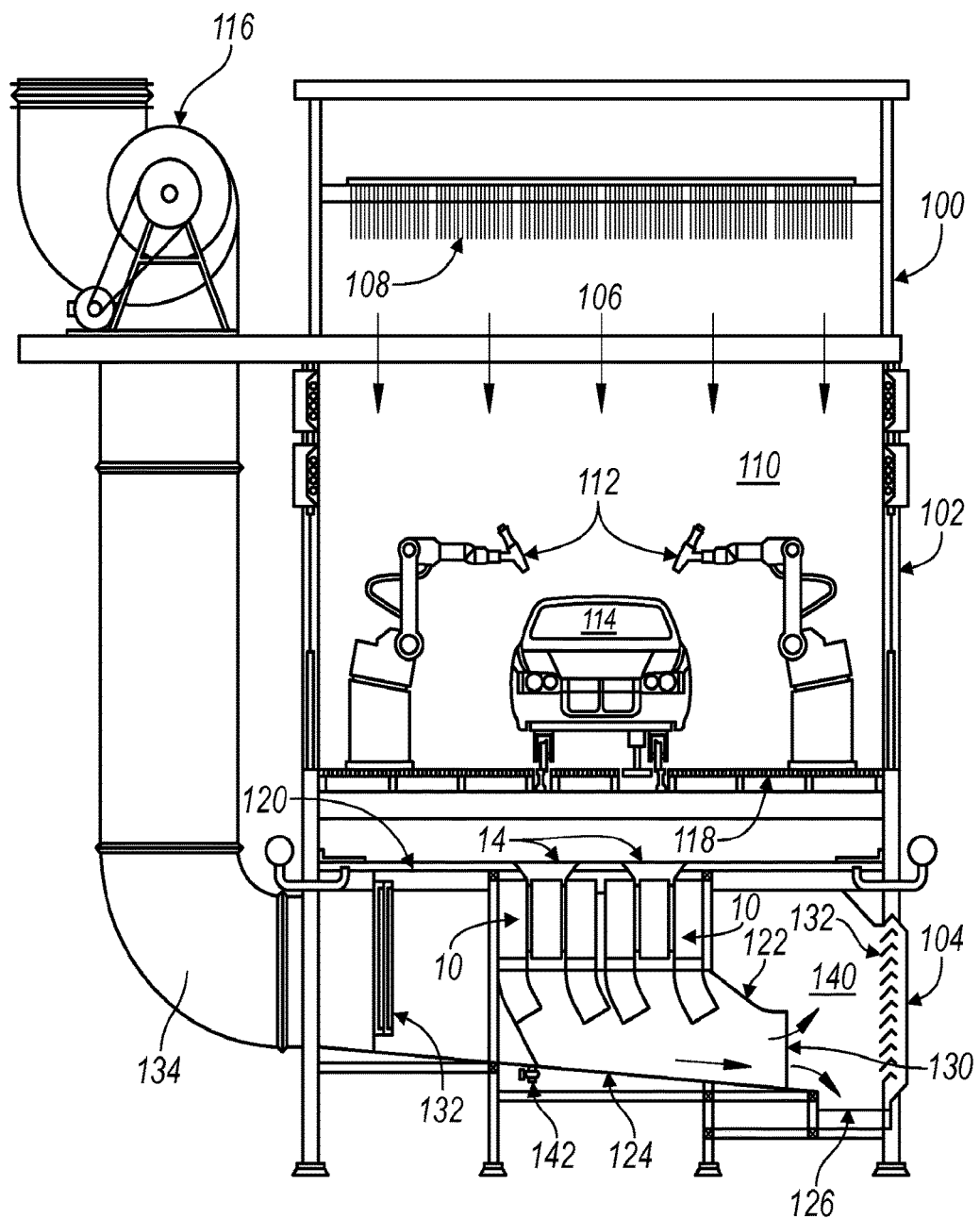
FIG. 2 is a cutaway schematic view of a paint spray booth incorporating a wet scrubber.

Typical automotive spray booths are manufactured in modular sections that are repeated lengthwise to create the complete booth. As seen in FIG. 2, a modular paint spray booth 100 includes an upper or spraying section 102 and an under or capturing section 104. The upper section 102 is in fluid communication with an air supply 106, such as ambient air blown in from outside the booth. Some of this air from the air supply 106 may be directed through filters 108 to a spraying area 110 that contains a plurality of paint spray guns 112. As a body 114, which for illustration purposes is an automobile body 114, enters the spraying area 110, the paint spray guns 112 are activated to deliver paint to the body 114.

During this spraying, paint that does not stick to the body 114 floats in the air as paint mist or overspray. With the assistance of an exhaust fan assembly 116, the flowing air and paint mist are directed from the spraying section 102, through a floor grating 118 and towards an inlet 14 of centrally located wet scrubber 10, the details of which is discussed below in further detail. Depending on the amount of air flow handled by the paint spray booth 100, the paint spray booth 100 may include one or more wet scrubbers 10 with a common central inlet or adjacent centrally located inlets.

The inlet 14 of the wet scrubber 10 is sealingly mounted to the flooded floor 120, a floor having a film or flow of water also directed to the inlet 14, thereby providing the only exit path for the paint laden air from the spray chamber 110. Accordingly, a mixture of water from the flooded floor 120 and air entrained with paint particles enters the inlet 14 of the wet scrubber 10. After the scrubbed air and water exit the wet scrubber 10, an exhaust enclosure 122 further directs the air and helps with controlling any splash of the water as it is emptied onto a floor 124 of the exhaust enclosure 122. Ideally, the water containing the paint particles captured in the wet scrubber 10 flows along the floor 124 of the exhaust enclosure 122, out of the outlet 130 of the exhaust enclosure 122, and into a sluice 126. The exhaust enclosure 122 may be tapered in width and preferably has its floor 124 sloped toward the sluice 126. From the sluice 126, the water may be collected for treatment and recycling or disposal, as desired.

Air exiting the outlet 130 of the exhaust enclosure 122 may have a minimal amount of paint particles and water droplets suspended therein. To capture the residual water droplets and paint, the air may proceed through a plurality of baffles 132, sometimes referred to as a mist eliminators, whereby the paint particles and water droplets may further collect. Different types of mist eliminators 132, different in terms of the operational principle, may be provided. The mist eliminator 132 to the right of the sluice 126 in FIG. 2 is a tangential mist eliminator designed to control splash generated above the sluice 126. Other mist eliminators 132, such as the one in FIG. 2 toward the exhaust plenum 134 of the exhaust fan assembly 116, collect water droplets as a result of the airflow through its tortuous pathway. Finally, the air may be directed through a final exhaust filter or filter system (not shown) before it is exhausted into the surrounding environment.

Figure 4A:
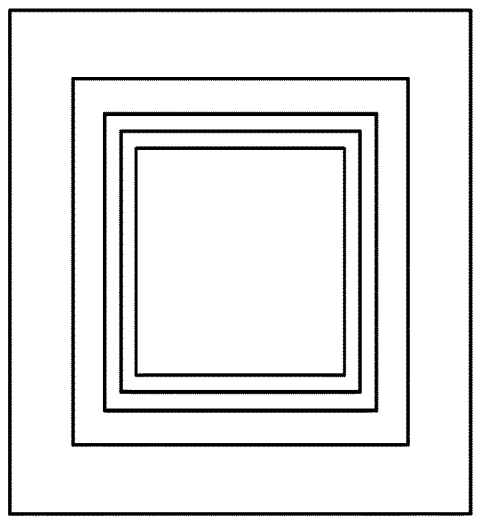
FIGS. 4A and 4B are schematic top and side views of two embodiments of an inlet conduit for the scrubber seen in FIG. 2.
Figure 4A:
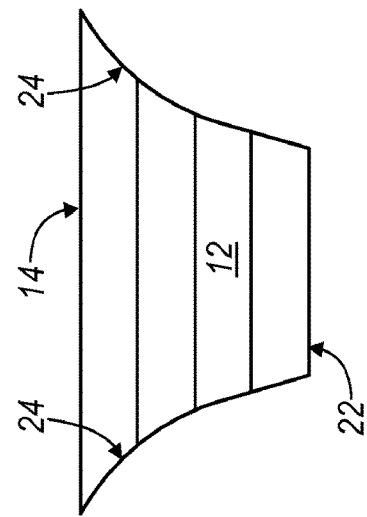
Figure 4B:
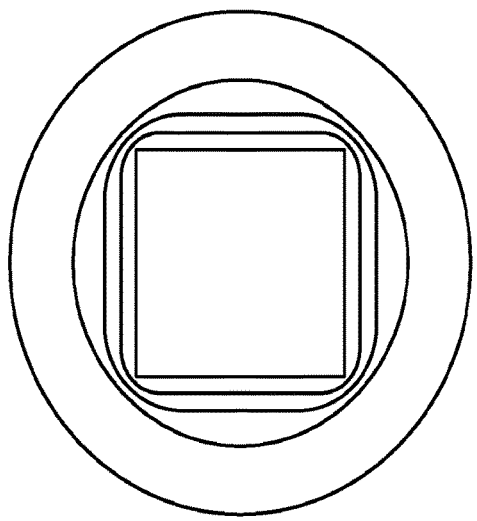
Figure 4B:
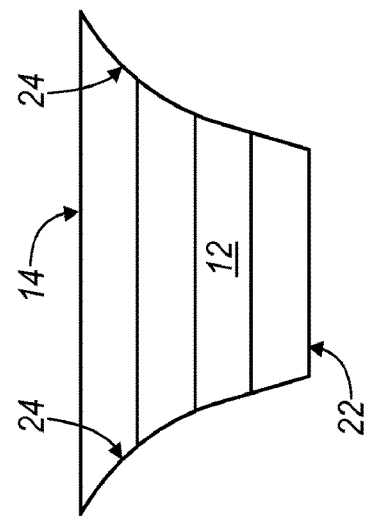

With reference to FIGS. 3A, 3B, 4A and 4B, the illustrated wet scrubbers 10 each include a conduit 12 having the inlet 14, a mixing chamber 16, a vortex chamber 18, and a diffuser 20. As best shown in FIG. 4A, the conduit 12 has a substantially square cross-section with the inlet 14 positioned at one end and the outlet 22 at the other end. Preferably, the conduit 12 is positioned in substantially the center of the wet scrubber 10 to provide optimal delivery of air entrained with paint and water to the mixing and vortex chambers (16 and 18, respectively). Proceeding from the inlet 14 to the outlet 22, the conduit 12 has a decreasing cross-sectional area. This change in dimension results in the speed of the air flow increasing as it proceeds through the conduit 12. The outlet 22 may have one or more adjustable plates 23a and 23b to optimize the speed of the air entrained with paint that exits the outlet 22. As shown, the adjustable plates may move in the direction β.

Although disclosed in this embodiment as having a substantially square cross-section, the inlet 14 may have any shape. For instance, and as shown in 4B, it may be circular and have a substantially conical profile, thereby giving the inlet a circular cross-section toward the inlet 14 (as discussed in U.S. Pat. Nos. 6,024,796 and 6,093,250, which are herein incorporated by reference).

As previously mentioned, the wet scrubber 10 is positioned adjacent to the water supply of the flooded floor 120. The water assists with the capture of the paint particles and also enters the conduit 12 through the inlet 14. The water flows down the surfaces of the interior walls 24 of the conduit 12, while the air entrained with paint particles proceeds in a similar direction. Due to the acceleration of the air going through the conduit 12, the water flowing on the interior surfaces of walls 24 starts breaking into droplets and begins mixing with the air. The air and water continue down the conduit 12, exits at the outlet 22, and enters a mixing chamber 16. To further accelerate the air and water, as well as to provide means to adjust to different operational conditions, the pair of adjustable plates 23a and 23b may be positioned in the mixing chamber 16 adjacent to, and in flow communication with, the outlet 22 of conduit 12.

The mixing chamber 16 includes an impingement pool 26 positioned adjacent to the outlet 22 of the conduit 12. Water flowing down the conduit 12 is collected in this pool 26. The air proceeding down the conduit 12 strikes this water, thereby mixing with the water and creating turbulence. Because of the turbulence created by this mixing, some of the paint particles in the air become transferred to the water and stay suspended therein. Hence, the water of the impingement pool 26 serves to "trap" some of these particles.

To increase this turbulence and assist with substantially evenly diverting the air into the vortex chambers (further discussed below), the mixing chamber 16 may include a divider 28, such as a flow divider, which also provides stability to the flow inside the wet scrubber 10. As shown in FIG. 3A, the divider 28 comprises joined curved surfaces 30a, 30b, which cooperate to define the impingement pool 26, such that the apex of the divider 28 substantially forms a line having a width W1 (see FIG. 3B), that may be substantially equal to the width at the outlet 22. Accordingly, at least a portion of the air and water that exits the outlet 22 engages the divider 28 and/or the curved surfaces 30a, 30b. Ideally, the divider 28 substantially evenly divides the air, thus providing a similar amount of air to each vortex chamber 18. This helps to create a stable system which further increases efficiency and saves energy. Besides dividing the supply of air and water, the divider 28 causes further mixing of the air and water in the impingement pool 26, thereby increasing mixing of these fluids and trapping of more paint particles in the water.

The principle by which the flow divider 28 placed at the center of the impingement pool 26 may assist particulate capturing while pre-conditioning the mixture that enters the vortex chambers 18 is explained next. As generally described earlier, when entering the conduit 12 through the inlet 14, the water coming from the flooded floor F2 runs as a film over the internal surfaces of walls 24 of conduit 12, while the paint laden air flows mainly through the center region of conduit 12. Due to acceleration of the air in conduit 12, the water film is broken into droplets that penetrate into the center region of the conduit 12 where the air is flowing. However, it is possible that, at outlet 22, segregated regions containing air entrained with overspray and a partially broken water film would still exist at the central and peripheral regions of the flow, respectively. The divider 28 further enhances capturing by bisecting these segregated regions and reversing their relative locations. For example, after being acted upon by the divider 28, the region containing paint laden air enters the vortex chamber at the peripheral region while the water film enters the chamber at the center region. Therefore, the paint laden air is "sandwiched" between the water film and the water contained at the bottom of the impingement pool 26 of the mixing chamber 16. Since water is roughly three orders of magnitude heavier than air, as soon as the sandwiched region enters the vortex chambers 18, the centrifugal force exerted squeezes the air and forces it through the water, hence, providing contact between the particles in the air and the water and, therefore, enhancing capturing.

With reference to FIG. 3A, the wet scrubber 10 includes two vortex chambers 18 symmetrically positioned about the line Y-Y. As shown, the vortex chambers 18 are substantially cylindrical, each having an inner wall surface 32. Upon entering the vortex chambers 18, the air and some of the water from the impingement pool and/or the outlet 22, begin to circulate. Given the geometry of the vortex chambers 18, the air/water mixture rotates around the chamber, thereby forming vortices. These vortices cause heavier particles, such as paint particles and water droplets, to move toward the periphery of the vortex chambers 18 and displace smaller droplets toward the center of the vortex where they stay colliding with other small droplets until they are big enough to precipitate to the periphery of the chamber 18. As these heavier particles contact one another, they join to form bigger particles. Specifically, the centrifugal force on the air/water mixture propels large water droplets and paint particles toward the inner wall surface 32 of the vortex chamber 18, which is covered with a water film. As the paint particles collide with the water on this surface, they become trapped in the water.

With further reference to FIGS. 3A and 3B, the vortex chambers 18 may optionally include a projection or protrusion, such as a rib 34, projecting from the inner wall surface 32 of each cylinder. As shown, the rib 34 extends less than halfway around the periphery of each vortex chamber 18; however, the rib 34 may have a longer extension. Preferably, the rib 34 is attached approximately midway along the length of the vortex chamber 18 between end caps 36 of the vortex chambers 18. This results in the rib 34 dividing the vortex chamber 18 into substantially equal sized sub-chambers 18a and 18b (seen in FIG. 3B). The rib 34 functions in a way similar to that of flow divider 28 by dividing the volume of air and water entering sub-chambers 18a and 18b equally, thereby further stabilizing the vortex and enhancing capturing. Due to the high speed circulation flow in the vortex chambers 18, the region at its center (the central vortex) has the lowest pressure. To reduce the pressure drop through the wet scrubber 10 (that is, the difference between the pressure values at the inlet and outlet of the scrubber), this lowest pressure has to be returned to a higher pressure value at the exit, hence, recovering pressure energy. By conservation of energy, this pressure recovery process is achieved by smoothly decelerating the flow that exits the wet scrubber 10. This deceleration has to be done in such a way that no substantial recirculations appear at the outlet of the scrubber.

After the air/water mixture goes through the vortex chambers 18 it enters the diffuser 20. As shown in FIGS. 3A, 3B and 6A-C, a plurality of diffusers 20 are positioned on the wet scrubber 10. Preferably, one diffuser 20 would be positioned at each end of each vortex chamber 18. Unlike previous wet scrubbers having spiral shaped volute exhausts with increasing cross-sections in the direction of discharge (see FIGS. 5A and 5B), the diffusers 20 include a plurality of curved surfaces 38 extending away from the vortex chamber 18. In other words, the surfaces 38 forming the diffuser are curved in a different direction than the curvature of the vortex chambers 18. Unlike previous volute exhausts, this difference in curvature helps to prevent the exhausted air from recirculating back into the vortex chambers, thereby resulting in a more efficient scrubber. Since the higher speed flow runs close to the peripheral regions of the vortex chamber, the different curvature helps decelerate the flow in that region to better equalize the speed of the flow exiting the wet scrubber 10.

Figure 5A:
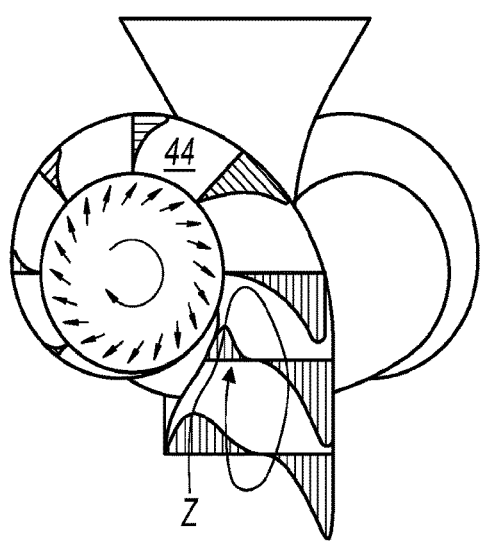
FIGS. 5A and 5B are cutaway schematic views showing the airflow and back flow in the volutes of prior art wet scrubbers.
Figure 5B:
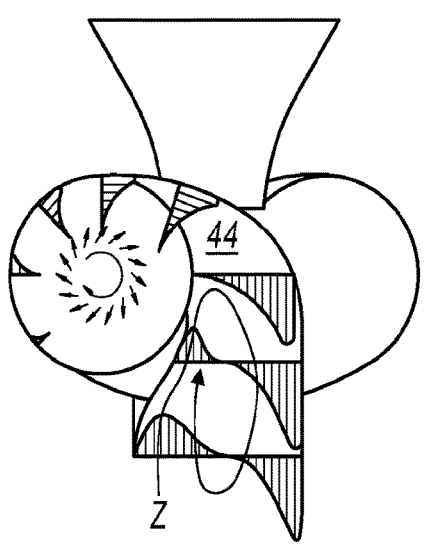

FIGS. 5A and 5B show the air flow patterns of a similar wet scrubber, but one utilizing the volute exhaust 44. The line Z shows the back flow (or recirculation) of the exhaust in these configurations. Recirculations waste valuable pressure energy propelling and sustaining the movement of the recirculating mass of fluid. However, when these recirculations penetrate the volute 44 and reach and perturb the flow in the vortex chambers, not only is pressure energy not recovered, capturing performance is reduced. Volutes 44 used in conventional scrubbers fail to efficiently recover pressure energy and reduce capturing performance because they allow recirculations at the scrubber exit that extend inwardly and perturb the capturing vortex flow in the chambers.

Figure 6A:
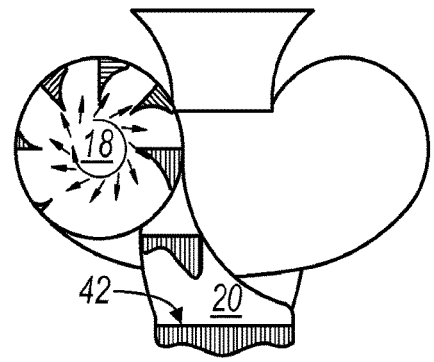
FIGS. 6A, 6B and 6C are cutaway schematic views showing the airflow in the diffusers of the scrubber seen in FIGS. 2, 3A and 3B.
Figure 6B:
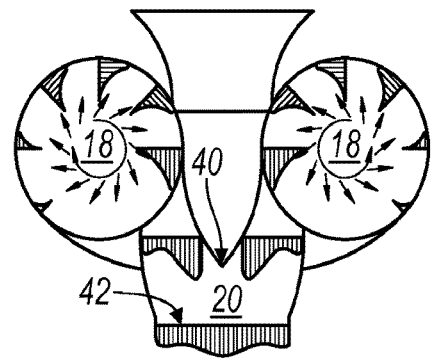
Figure 6C:
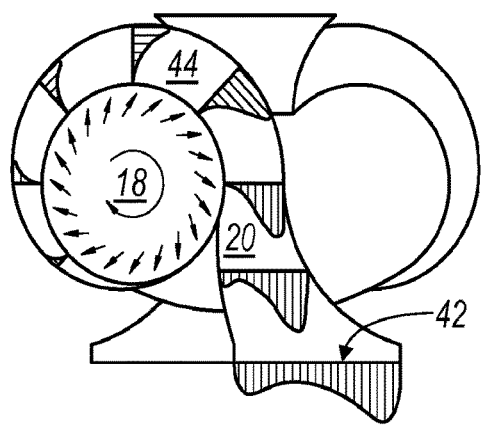

In contrast, FIGS. 6A-C show the air flow utilizing several typical embodiments of a wet scrubber 10 and diffusers 20 that may be preferably incorporated into the present invention. FIG. 6A shows a single diffuser 20 (one-sided diffuser) case. This type of diffuser 20 is preferably used at the end of vortex chambers 18 that do not have a rib 34. As the air/water mixture exits the vortex chamber 18, the speed of the flow near the external periphery is substantially higher than that of the central regions. The curvature of the surfaces 38 of diffuser 20 (shaped contrary to those of volutes) allows for the smooth deceleration of the airflow in the periphery to equalize the speed of the flow at the diffuser exit, thus, minimizing or avoiding any recirculation and, hence, improving pressure energy recovery.

FIG. 6B displays a double diffuser 20 (two-sided diffuser). This type of diffuser 20 is used preferably with or without a rib 34 placed at the center of the vortex chamber 18. As the air exits from both vortex chambers 18, the double diffuser 20 directs the air together at the point 40, whereby the air collides and further mixes in an exhaust mixing chamber. This provides another opportunity for paint particles to further become trapped with water droplets in the air. When the air flowing through the branches of the double diffuser 20 (one coming from each vortex chamber 18) meet at point 40, the air streams collide creating a turbulent mixing. This collision results in the air streams expanding away (or bouncing back), making the exhaust air flow reaching exit 42 more uniform, which, in turn, helps transform the air's kinetic energy into pressure energy, thus, enhancing pressure recovery and, therefore, reducing the effective pressure drop through the wet scrubber 10. After the air collides, it exits the wet scrubber 10 through the exhaust 42 (FIG. 6B) without any back flow. In addition to substantially eliminating back flow of the air, this configuration of diffusers 20 positioned at the ends of the vortex chamber 18 also increases the scrubbing efficiency. Specifically, because the air entrained with paint resides in the vortex chamber 18 for a longer period of time, there is greater chance for collision of the particles.

FIG. 6C presents a combination of a low expanding pitch volute 44 and a diffuser 20 with an inverse curvature. This combination attempts to use the advantages of both. The volute 44 decelerates the flow but still preserves high speed regions at the periphery. The diffuser located at the end completes the deceleration (pressure recovery) process but prevents detrimental recirculation at the exhaust of the scrubber.

Figure 7:
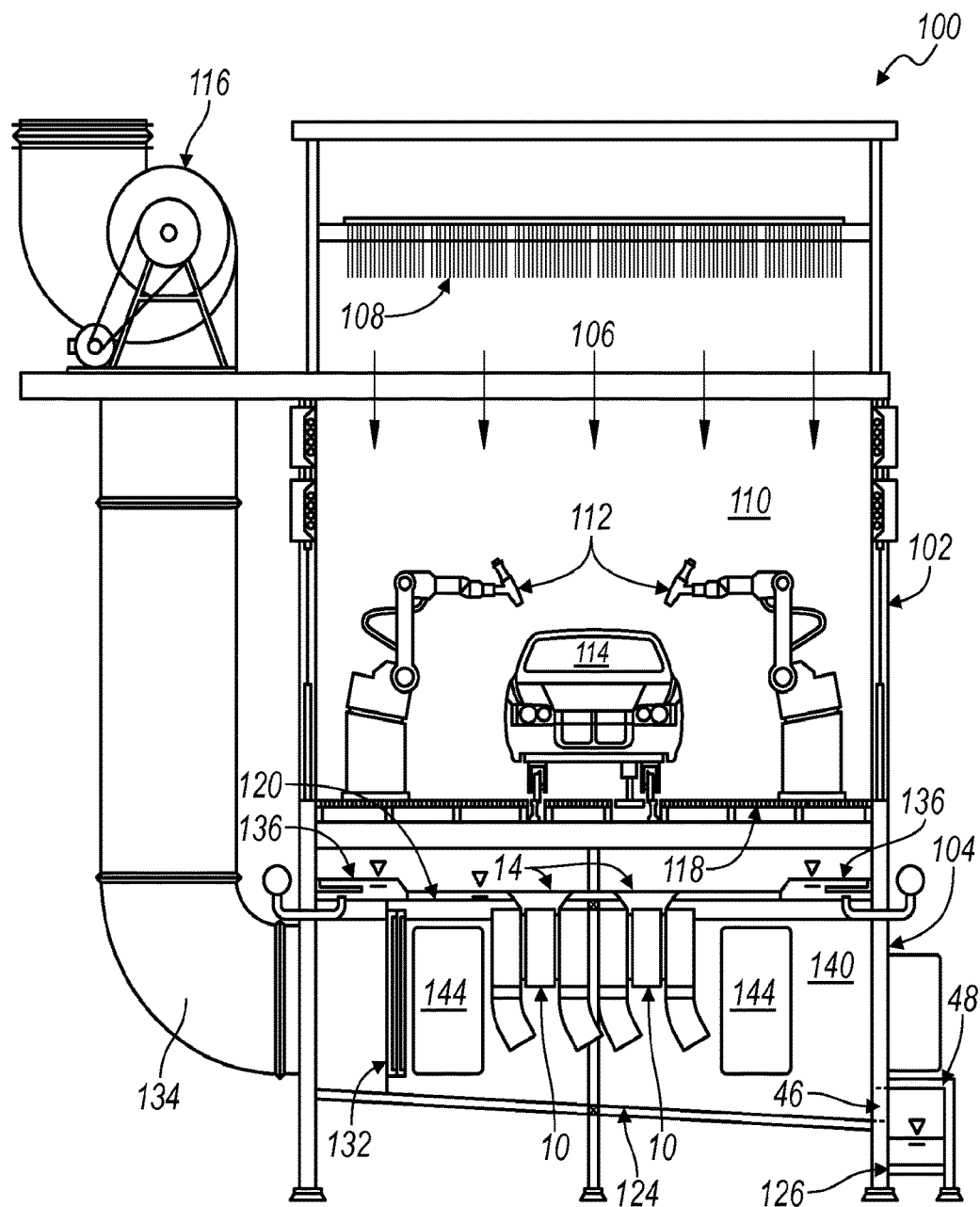
FIG. 7 is a cutaway schematic view of another representative paint spray booth utilizing the principles of the present invention.
Figure 8:
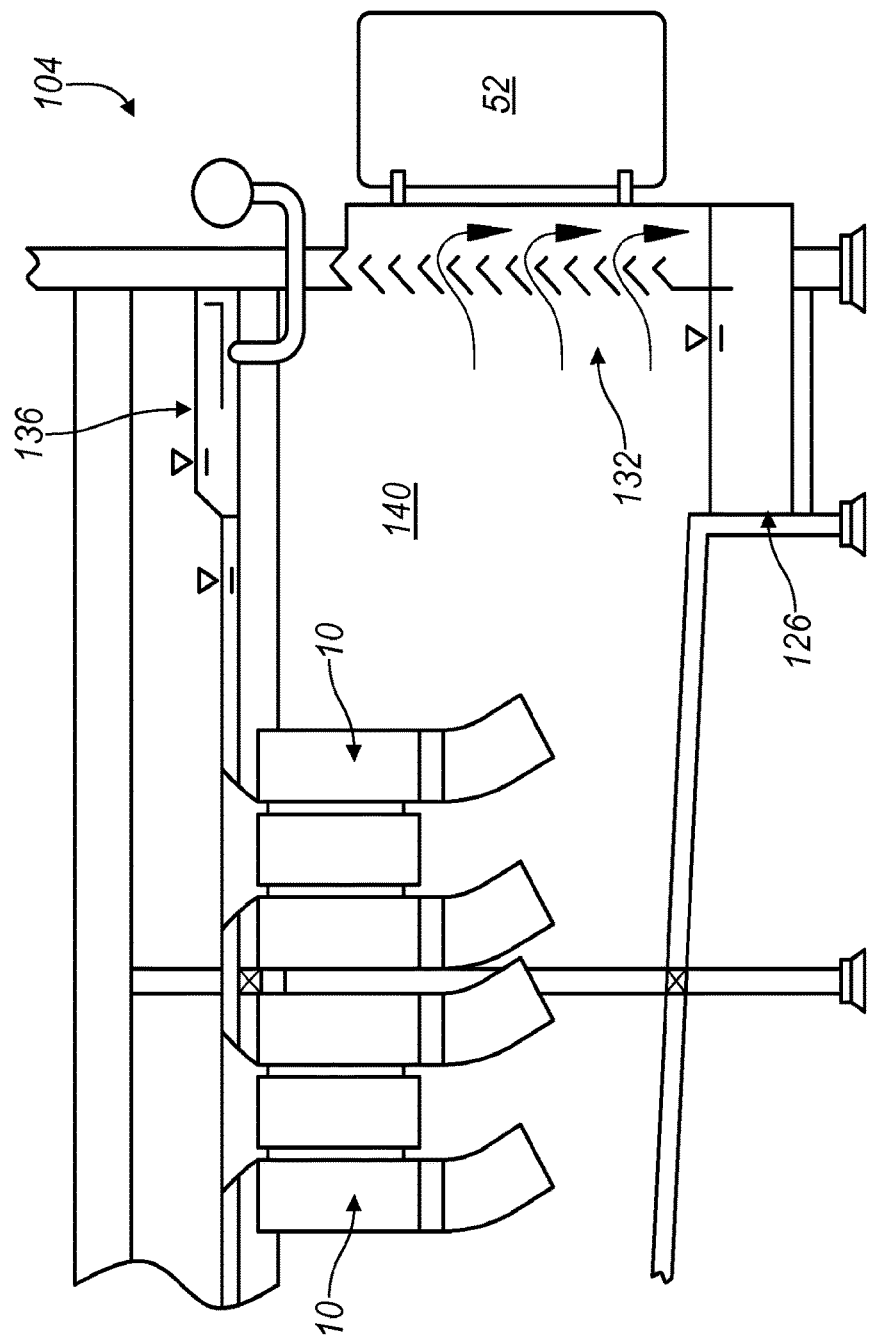
FIG. 8 is an enlarged, partial cutaway schematic view of an under section of a paint spray booth according to the principles of the present invention.

The discussion so far is not intended to be exhaustive and modifications or variations on the described discussion are possible. For example, although discussed as being a flooded floor 120 using water, this may be any liquid (e.g., solvents, water/solvent combinations, or other). The configuration of the flooded floor 120 may be changed to include troughs 136 (see FIG. 7) and a sloped floor (not shown). Also, the wet scrubber 10 may have any number and configuration of vortex chambers 18. For instance, instead of the two shown, the vortex chambers 18 may be combined into a single chamber or, as shown in FIG. 8, the mist eliminator 132 is positioned directly over the sluice 126. In this configuration, there is little or no pressure drop by the mist eliminator 132.

The wet scrubber 10 may also include exhaust extensions 45 (shown in FIGS. 3A and 3B) attached to the exhaust 42. As shown, these exhaust extensions 45 comprise a curved conduit for directing the exhaust in a desired direction and/or moderating the exhaust. The conduit may have a uniform cross-section or a changing cross-section to further recover pressure, reducing the overall pressure drop. Eliminating or modifying these exhaust extensions 45 allows for the overall dimensions of the wet scrubber 10 to be modified. Additionally, one may modify the length of the conduit 12 and the dimensions of the mixing chamber 16 and vortex chamber 18, as desired. Also, the tank 140 of the under section 104 and the scrubbers 10 may also have one or more drains 142 (the drain 142 of the under section 104 being shown in FIG. 2; a scrubber drain not being shown) and one or more access doors 144 (see FIG. 7) for accessing the interior of the under section tank 140 and the exhaust enclosure 122 (i.e., when cleaning the tank and the enclosure). One will appreciate that instead of the single exhaust enclosure 122, which is not shown in FIG. 7, multiple exhaust enclosures may be provided. Furthermore, end caps 36 (see FIG. 3B) of the vortex chambers 18 may be removable or have one or more access doors (not shown) for accessing the interior of the wet scrubber 10 themselves (i.e., when cleaning the interior of the wet scrubber 10).

Also, the sluice 126 may be positioned in a variety of positions in relation to the wet scrubber 10 and/or the spray booth 100. In the variation shown in FIG. 7, the sluice 126 is positioned outside the under section tank 140 and an opening 46 allows water containing the paint particles to exit the under section tank 140 and enter the sluice 126. Positioning the sluice 126 in this manner may assist with preventing material in the sluice 126 from being disrupted and reintroduced into the air in the under section 104. As shown in FIG. 7, the sluice 126 positioned outside the under section tank 140 and may have one or more access doors 48 for accessing the sluice 126, when desired (i.e., when cleaning the sluice). Instead of one sluice 126 as shown in FIGS. 2 and 7, multiple sluices 126 may be provided.

An improvement on the above mentioned paint booths is the providing of a paint booth system with a wet scrubber and a shallow depth under section. In terms of the advantages of the shallow depth under section, the following are noted: (1) by being shallow, the system minimizes digging cost (which are very expensive) when installing a new facility with a new under section and/or adds flexibility when retrofitting old under sections that may not have the depth required by some current systems; (2) it is modular and as such the shallow modules are smaller with less than about half the size of current under section modules (this has an advantage for getting into tight spaces, as may exist at current plants, and are also easier to transport to the installation site; (3) the wet scrubbers have internal cyclonic dewatering of the air and the under section does not use mist eliminators (which are a source of height limitation and a maintenance expense due to further cleaning requirements, especially if the scrubbers generate significant water entrainment and paint sludge splash; (4) it minimizes airflow speed at the exit allowing for a low pressure drop and minimum water carry over (a common problem in many under section designs), if any; and (5) reduces capital investment and facilitates installation, thereby reducing installation costs.

In an embodiment of a spray booth module incorporating the principles of the present invention, the wet scrubbers are preferably of the above described design and of a scalable configuration, with a number of smaller wet scrubbers per module. The wet scrubbers are positioned in a manner that helps distribute and create better airflow in the upper (paint spraying) section, thereby reducing quality issues due to dead airflow zones and recirculation zones in the upper section; this may reduce the cleaning costs of the upper section and improve air distribution, which in turn would reduce paint quality issues caused by poor airflow. Additionally, by positioning the wet scrubbers in the described manner, a shallower under section may be provided and the required distance between the floor grating of the spraying chamber and flooded floor may be reduced, further reducing the needed overall depth.

Further details of the shallow depth paint spray booth are seen and disclosed in connection with FIGS. 9-17.

Figure 9:
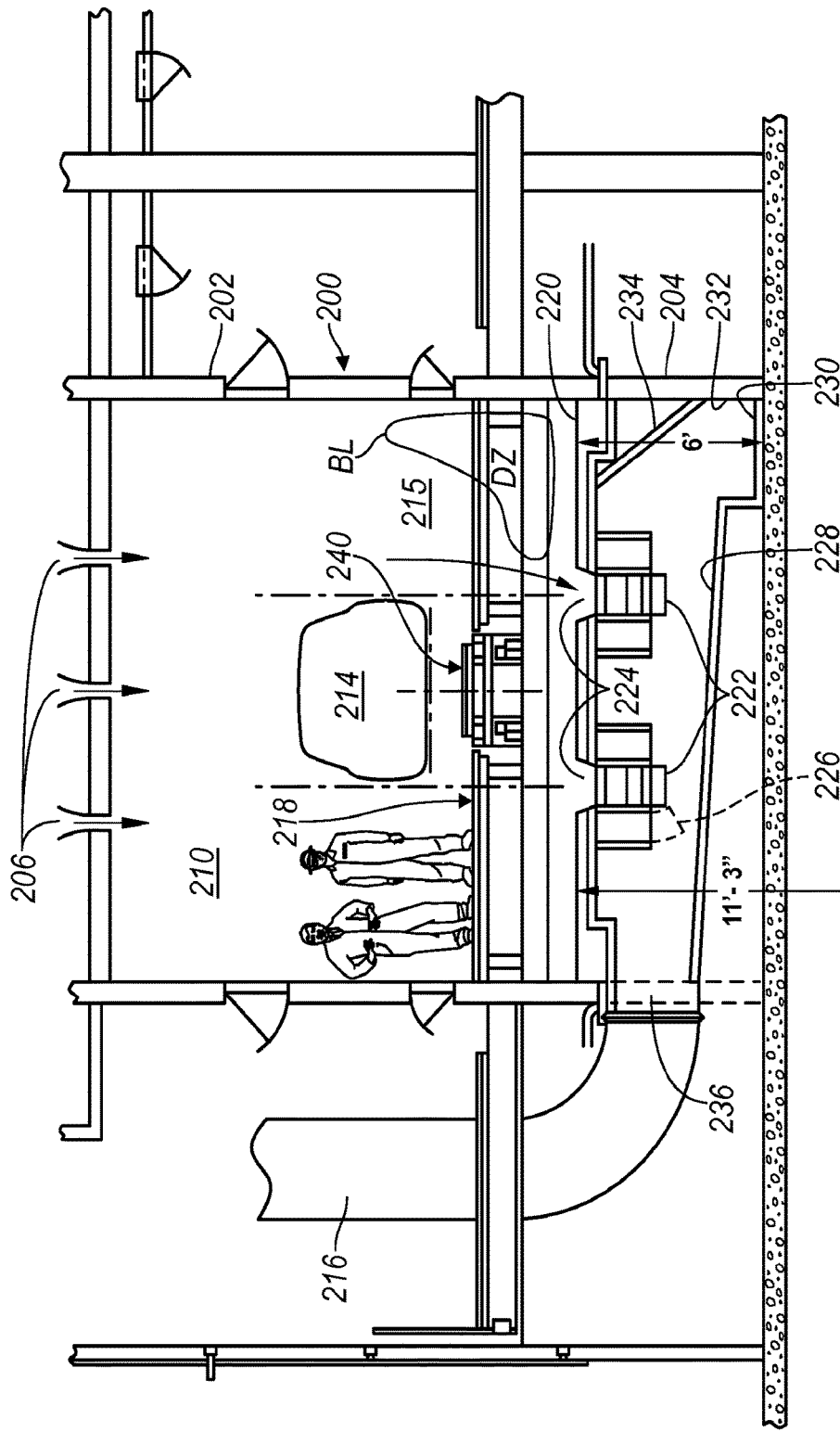
FIG. 9 is a schematic view of an embodiment of a paint spray booth module embodying the principles of the present invention, illustrating the wet scrubbers with the exhaust extensions being omitted.

As seen in FIG. 9, a paint spray booth module 200 includes an upper or spring section 202 and an under or capturing section 204. The upper section 202 is in fluid communication with an air supply 206, such as ambient air blown in from outside the spray booth 200. Some of this air from the air supply may be provided through filters and directed to a spraying area 210 that includes a plurality of spray guns (not shown, but of the variety seen in FIG. 2). As an body 214, such as an automobile body, enters the spraying area 210, the spray guns are activated to deliver paint to the body 214.

As previously discussed, during spraying, paint that does not adhere to the automobile body 214 floats in the air as paint mist or overspray and is generally generated in the lateral areas 215 outward to the left and right sides of the body 214. With the assistance of an exhaust fan assembly and plenum, generally designated at 216, the flowing air and paint mist are directed from the spraying area 210, through a floor grating 218, over a flooded floor 220 (a surface flooded with a water film) and toward an inlet 224 of a scalable wet scrubber 222, preferably of the above described variety having a vortex chamber.

The wet scrubbers 222 are sealingly mounted to the flooded floor 222 and, accordingly, provide the only exit path for the air containing the overspray or paint mist. The inlet 224 of the wet scrubber 222 therefore receives not only the paint laden air, but also an overflow of water from the flooded floor 220.

The wet scrubbers 222 are designed such that the paint mist is removed from the air and captured by the water flowing through the wet scrubber 222 and the air de-watered. Furthermore, the velocity at which the now paint laden water is discharged from the wet scrubber 222 is reduced such that any splash created by the paint laden water upon discharge from an outlet or exhaust extension 226 (one being shown in phantom in FIG. 9 for clarity purposes) is minimal To further reduce splash, the exhaust extension 226 may be angled in the direction of the downward slope of the sloped floor 228. The paint laden water then flows along the sloped floor 228 into a sluice 230, where it is collected for removal and, thereafter, treatment, recycling and/or disposal. All paint particles are trapped in the water exiting the scrubber 222 and air exiting the wet scrubber 222 is practically free of paint particles.

Since the wet scrubber 222 is configured so that the paint laden water is discharged from the wet scrubber 222 to minimize splash, and further since the air exiting the wet scrubber 220 is free of paint particles, various changes can be made to the construction of the under section 204. These changes allow for a reduction in the vertical height of the under section 204 and further allow for decreased maintenance and cleaning of the under section 204. Specifically, a distinct exhausting closure is eliminated from the under section 204. Instead, the walls 232 and sloped floor 228 of the under section 204 are used to completely define and operate as the plenum for directing air to the exhaust fan assembly 216. Accordingly, the sluice 230 is located within the same chamber as the exhaust extension 226 from the wet scrubber 222 and is not separated therefrom. Additionally, the lack of splash and paint particles in the air exiting the wet scrubber 220 allows for the removal of another component, mist eliminators. As noted above, mist eliminators are large structures located within the under sections of the prior art paint spray booths in an attempt to eliminate water and paint mist from entering the exhaust fan assembly. Eliminating these structures not only allows for a reduction the overall vertical height of the under section 204, but also significantly reduces the maintenance/cleaning of the under section 204. Mist eliminators, as noted above, are typically baffle structures defining a tortuous pathway with multiple surfaces designed to capture and retain water droplets and paint particles from the air before exhausting of the air through the exhaust fan assembly. By their very nature, these structures are large and time-consuming to maintain/clean.

As seen in FIG. 9, the vertical wall 232 adjacent to the sluice 230 includes an optional upper wall section 234 that is sloped in the direction back toward the discharging of air and paint laden water from the exhaust extension 226. The sloping of this upper wall section 234 facilitates the reversal the flow of air from the exhaust extension 226 and toward an exit opening 236 defined in the under section 204 and connected to the exhaust fan assembly 216.

The design of the wet scrubbers 222 employees horizontally oriented vortex chambers 238, generally oriented as seen in FIGS. 3A and 3B. The described design is highly efficient and has also been found to be highly scalable without sacrificing efficiency. This allows the size of the wet scrubbers 222 to be varied based upon the number of wet scrubbers 222 incorporated into the under section 204 of the spray booth module 200.

Figure 10:
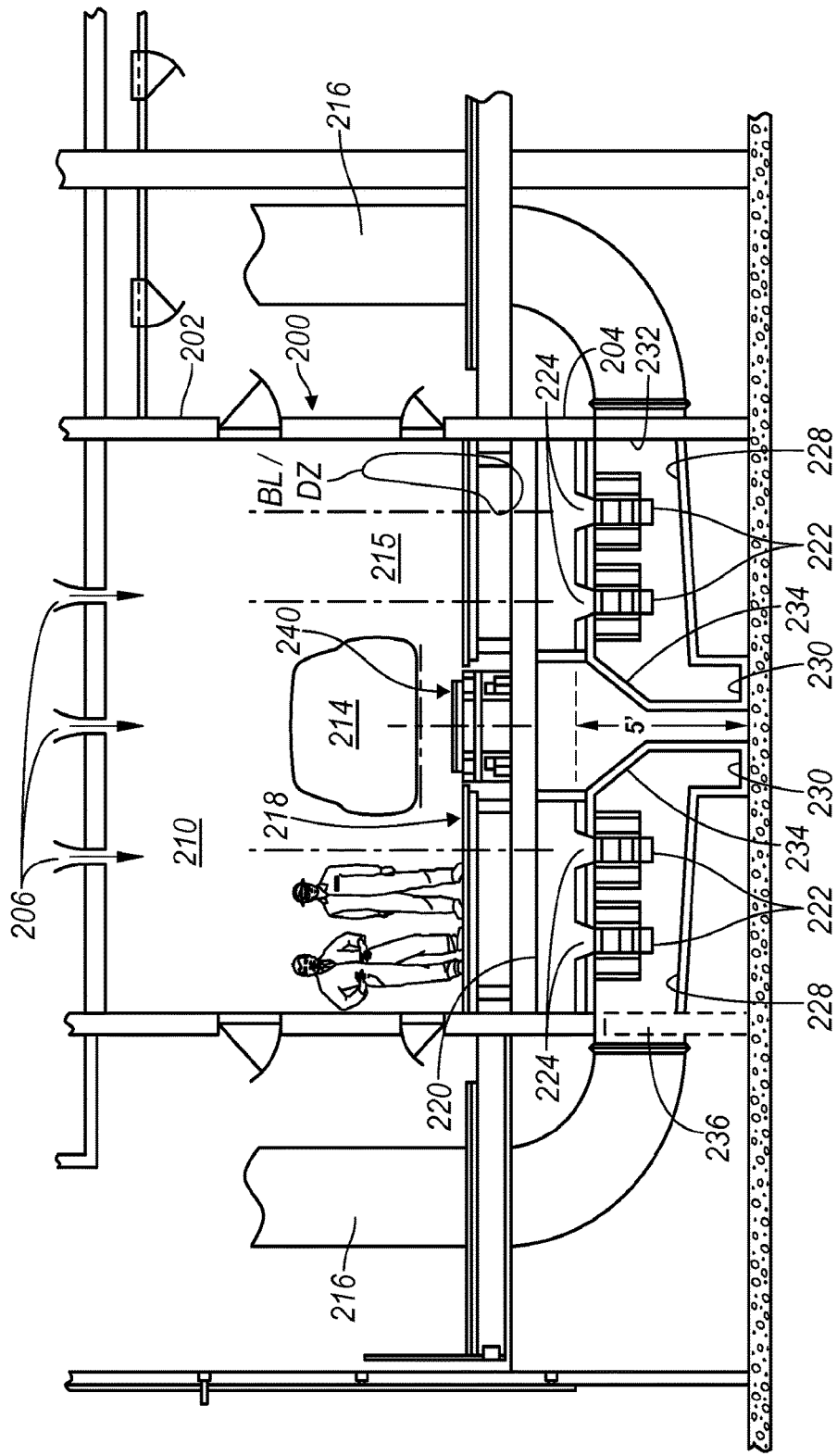
FIG. 10 is a schematic view of an additional embodiment of a paint spray booth module embodying the principles of the present invention.

As seen in FIG. 10, two wet scrubbers 222 are incorporated into the under section 204 and symmetrically positioned on opposing lateral sides of the conveyor 240 transporting the body 214 through the spray booth module 200. More specifically, the two wet scrubbers 222 are laterally positioned such that their inlets 224 are located directly below the location where the overspray from the body 214 is generated. In other words, the inlets 224 themselves are substantially located laterally outward of the conveyor 240, and preferably laterally outward of the vertical extend of the body 214, as denoted by the dashed vertical lines in FIG. 9.

Figure 1:
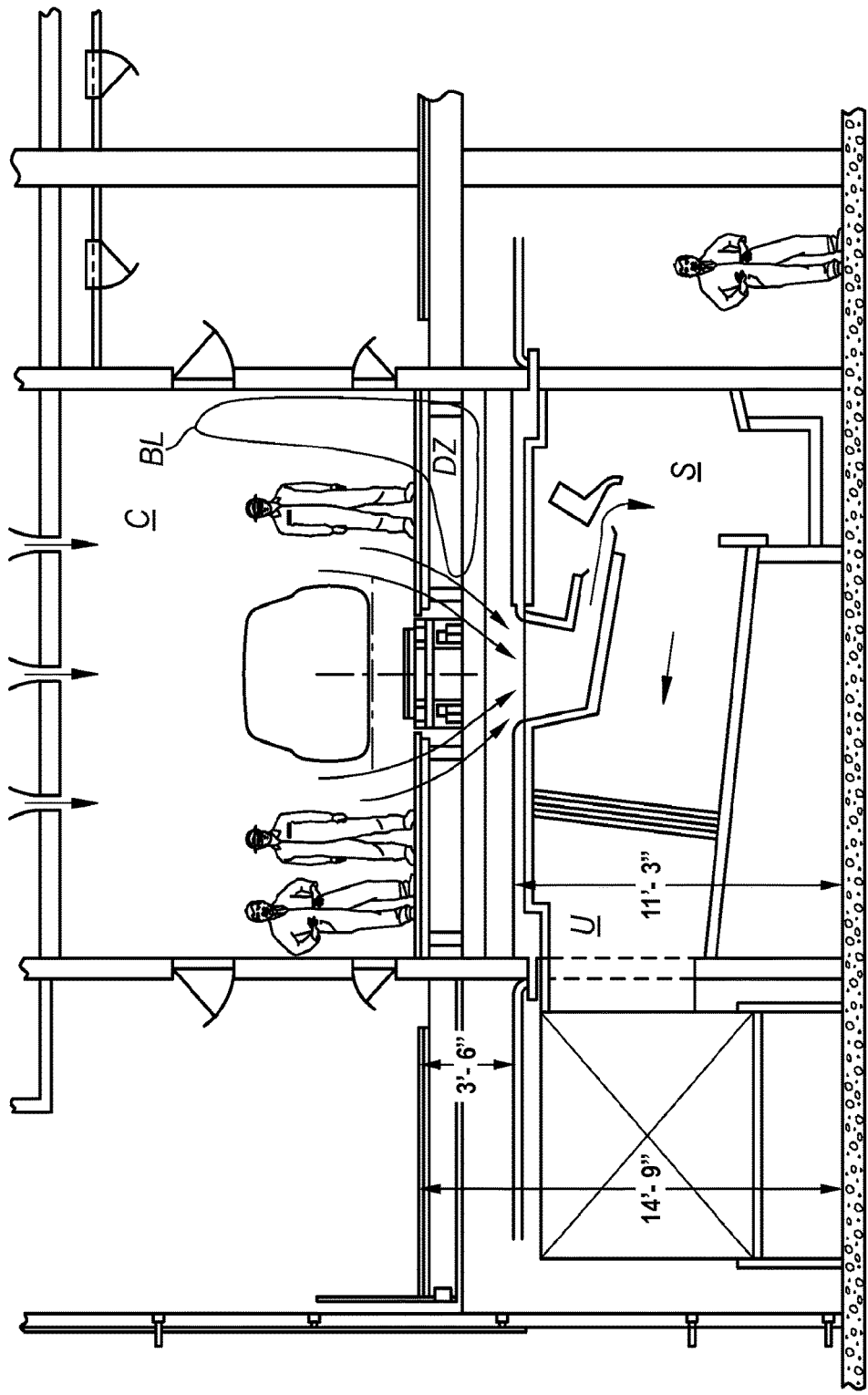
FIG. 1 is a schematic view of a conventional paint spray booth according to the prior art.

This positioning of the wet scrubbers 222 results in numerous advantages. These include reduced overspray accumulation on the support beams in the vicinity of the conveyor 240, a reduction in the boundary layer (BL) separation of air from the side walls of the upper section 202, more vertical air flow through the upper section, and a reduction in the size of the recirculation/dead zone (DZ) that occurs above the flooded floor 220 and toward the sidewalls of the upper section 202 (compare FIG. 1 and FIG. 9 in this regard). Since the two wet scrubbers 222 can also be smaller in size, this in turn allows the vertical height of the under section 204 to be reduced to about 6 feet. Compared to the vertical heights of conventional under sections, this amounts to a reduction of about 5 feet or 45%.

Figure 11:
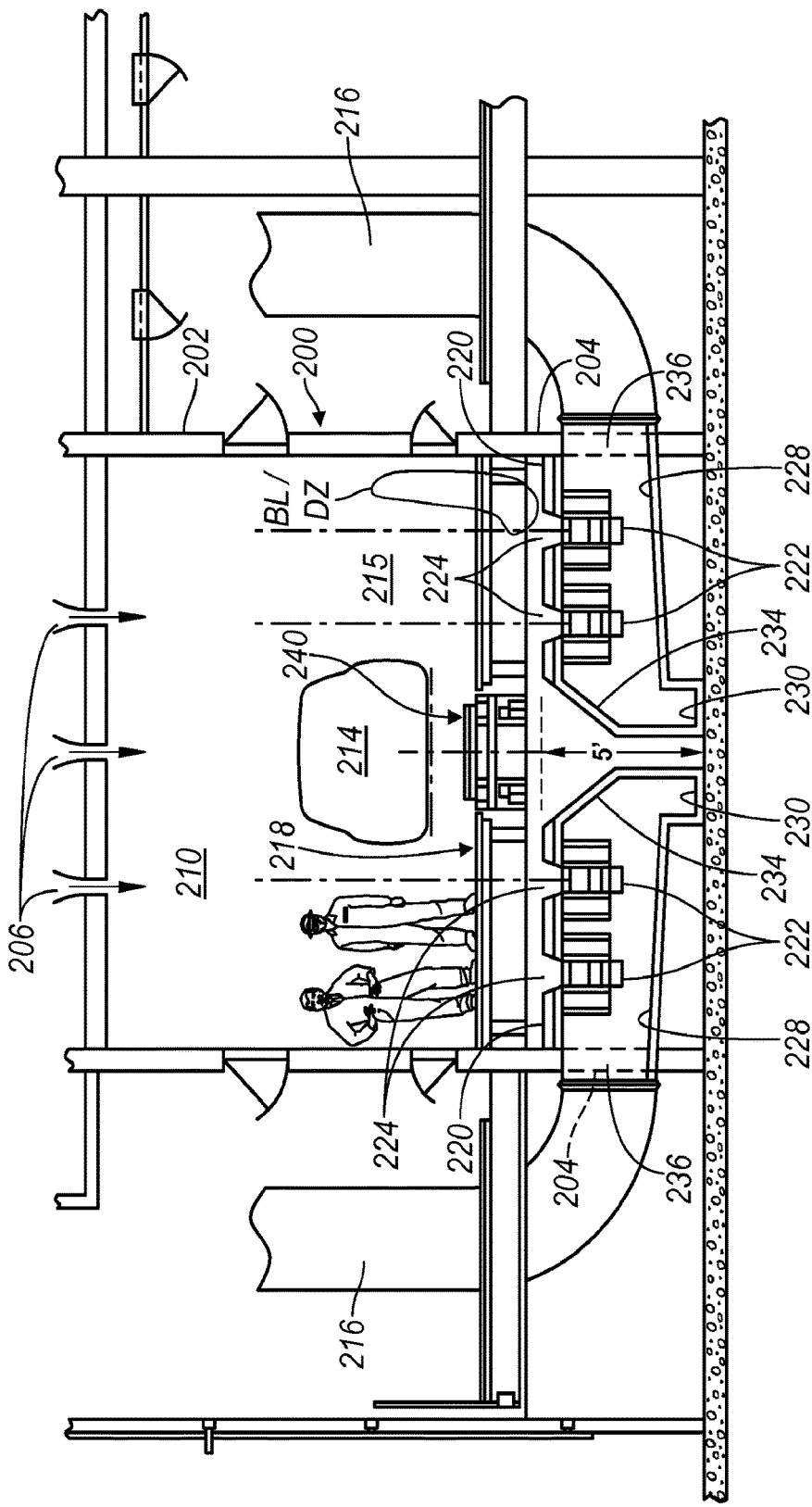
FIG. 11 is a schematic view of still another embodiment of a paint spray booth module embodying the principles of the present invention.

The additional embodiment shown in FIG. 10 employs a variation of the embodiment seen in FIG. 9. In this embodiment, two under sections 204 are symmetrically provided on opposing sides of the spray booth module 200. Each of the under sections 204 includes two wet scrubbers 222, for a total of four wet scrubbers 222 in the spray booth module 200, and each under section 204 is coupled to an exhaust fan assembly 216, one exhaust fan assembly 216 being located on each side of the spray booth module 200. By providing two under sections 204, two appropriately scaled wet scrubbers 222 can be located laterally on each side of the body 214 being sprayed. Locating two wet scrubbers 222 on each side of the body 214 further allows for the inlets 224 of the wet scrubbers 220 to be positioned in a location directly below the area 215 where the overspray is generated. This location of the wet scrubbers 222 includes all of the benefits discussed above in connection with FIG. 10 and further allows the flow of air through the upper section 202 to remain even more vertical until reaching the inlets 224 of the wet scrubbers 222 (reducing the boundary layer (BL) separation), which in turn further reducing the recirculation/dead zone (DZ) of paint laden air above the wet floor 220. Because of the reduced size of the recirculation/dead zone, it is now possible to reduce the distance from the floor grating 218 to the surface of the water of the wet floor 220, which is shown in FIG. 11. This is achievable because the paint laden air is more direct in its flow into the inlets 224 of the scrubbers 222 and this air flow is not required to flow transversely over the surface of the wet floor 220 any significant distance. The scalability of the wet scrubbers 222 allows the vertical height of the under section 204 to be reduced in this instance to about 5 feet. Compared to the vertical heights of conventional under sections, this amounts to a reduction of about 6 feet or 55%. As noted and seen in FIG. 11, this embodiment also allows the floor grating 218 to flooded floor 220 distance to be reduced, by about 1.5 feet, thereby reducing the total vertical height of the module 200 by about 7.5 feet or 68%.

Figure 12:
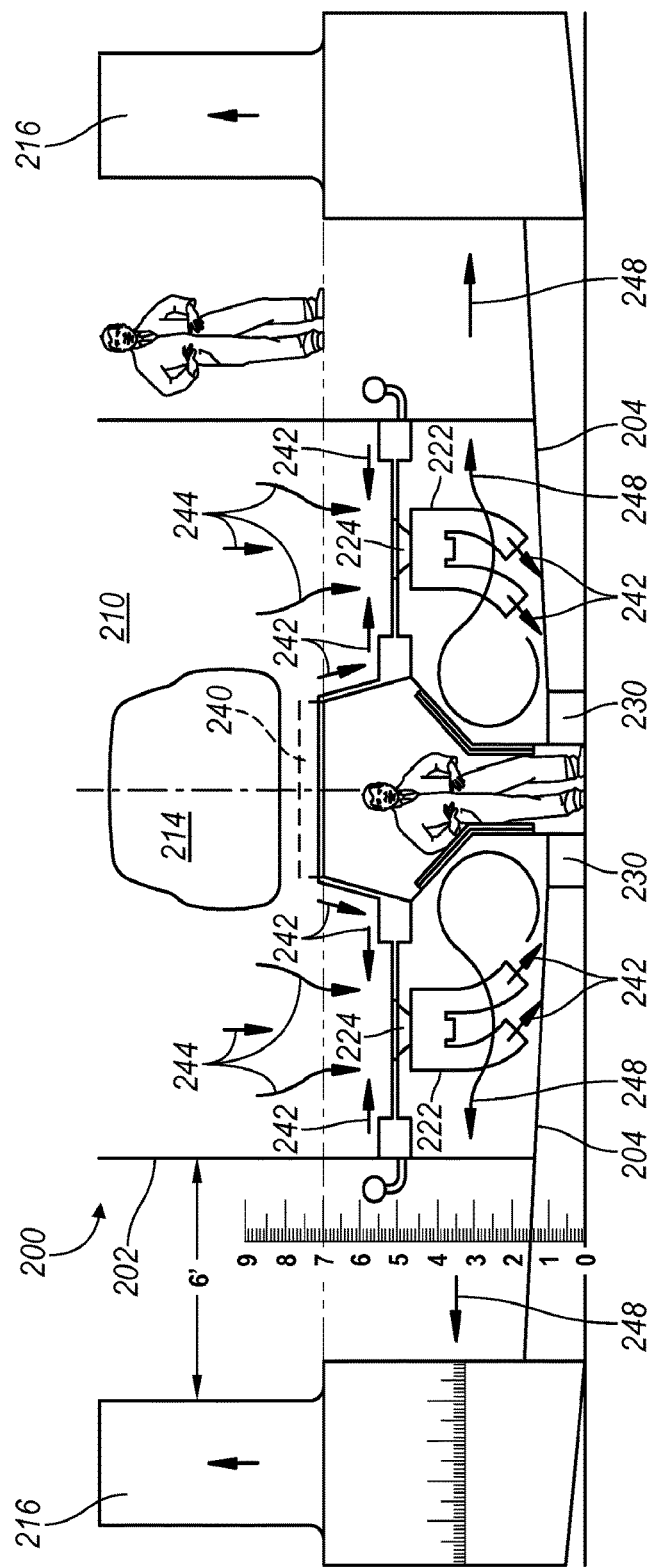
FIG. 12 is a schematic view of a paint spray booth module embodying the principles of the present invention and water distribution through the scrubber.
Figure 13:
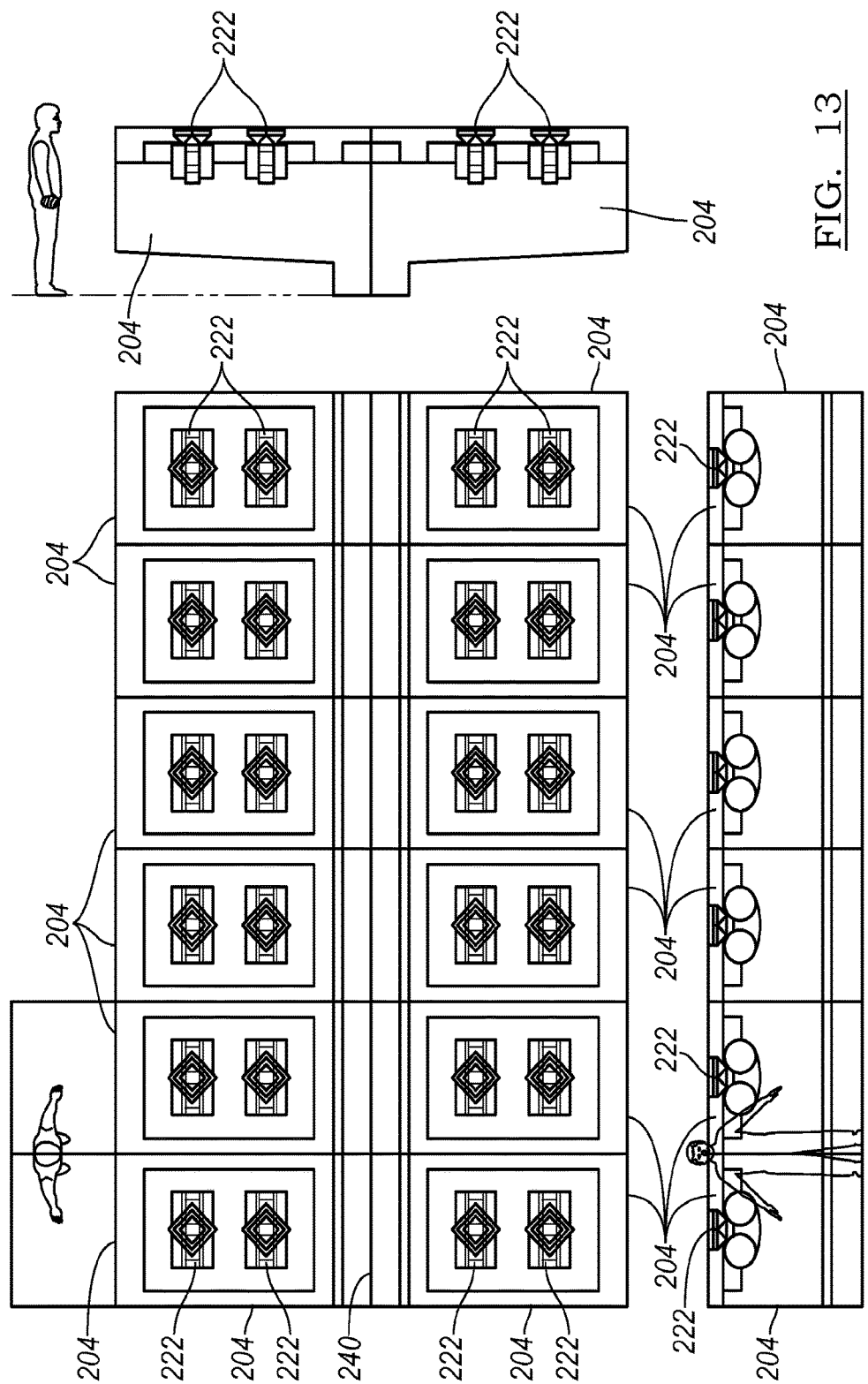
FIG. 13 is a schematic view of a series of under section modules in accordance with the principles of the present invention.
Figure 14:
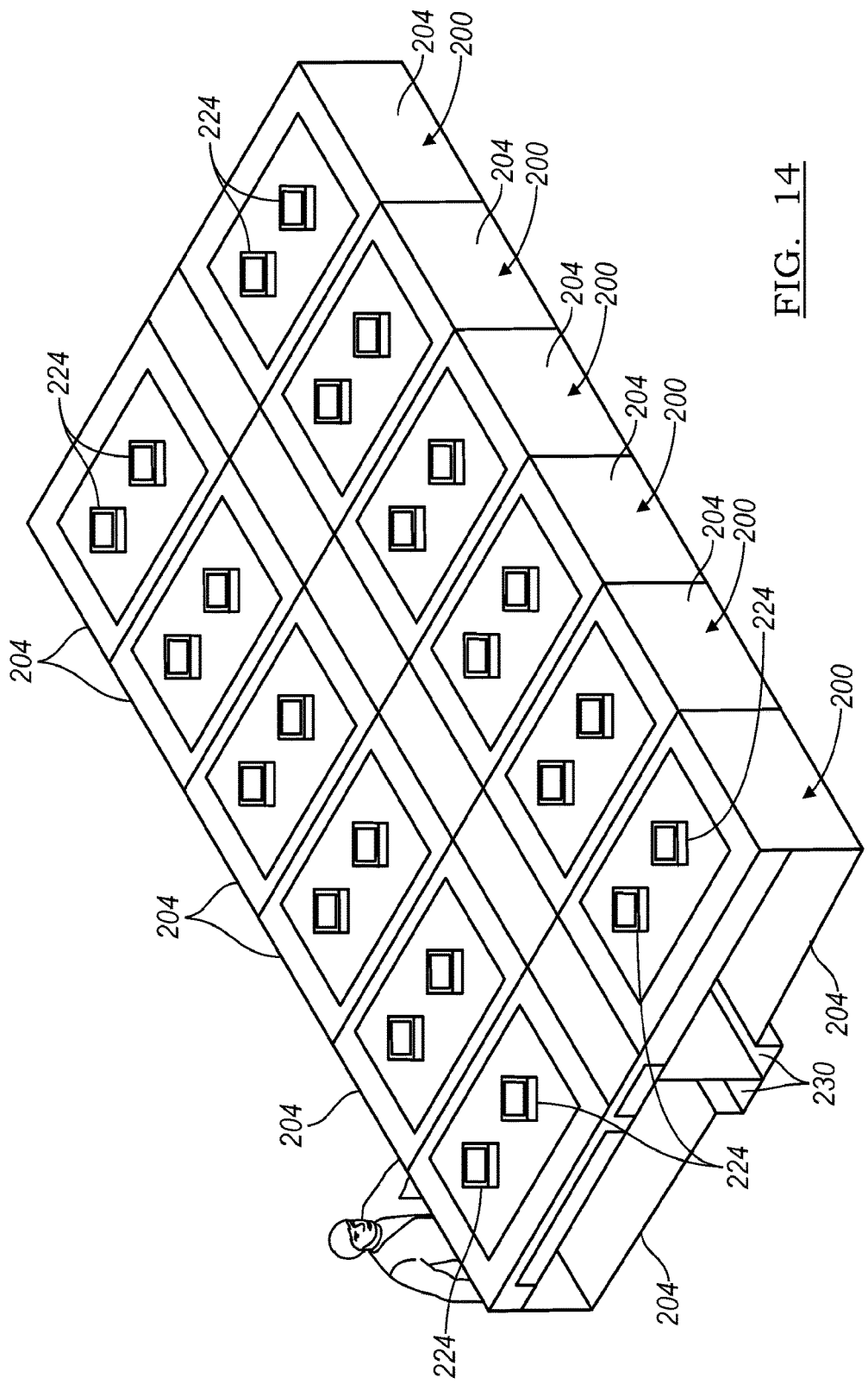
FIG. 14 is a perspective view of the series of under section modules generally seen in FIG. 13.

Referring now to FIG. 12, and embodiment of the present invention is illustrated therein with two under sections 204 on opposed lateral sides of the spray booth module 200, with each under section 204 having a wet scrubber 222 centrally beneath the area 215 where the over spray is generated. A second wet scrubber 222 may be longitudinally adjacent to the illustrated wet scrubber 222. Like the embodiments of FIGS. 10 and 11, each of the under sections 204 is coupled to an exhaust fan assembly 216. Thus, two exhaust fan assemblies 216 are utilized, one on each opposing side of the spray booth module 200. FIG. 12 further illustrates the general flow of water 242 and paint laden air 244 through the upper section 202 and lower section 204 of the spray booth module 200. As illustrated therein and previously noted, with wet scrubbers 222 positioned on each side of the body 214 and located more directly below the area 215 where the overspray is generated, the flow of paint laden air 244 can remain substantially vertical through the upper section 202 and into the wet scrubbers 222, minimizing the boundary layer (BL) separation and the size of the recirculation/dead zone (DZ). Upon exiting the wet scrubbers 222, the flow of cleaned air 248 is reversed, in part by the optional upper wall section 234, and redirected into the exhaust fan assembly 216. The flow of water 242 is generally laterally across the flooded floor 220 to the inlet 224, both inward and outward relative to the spray booth module 200, and, upon exiting the wet scrubber 222, is directed by the sloped floor 228 of the under section 204 toward the sluice 230.

Figure 15:
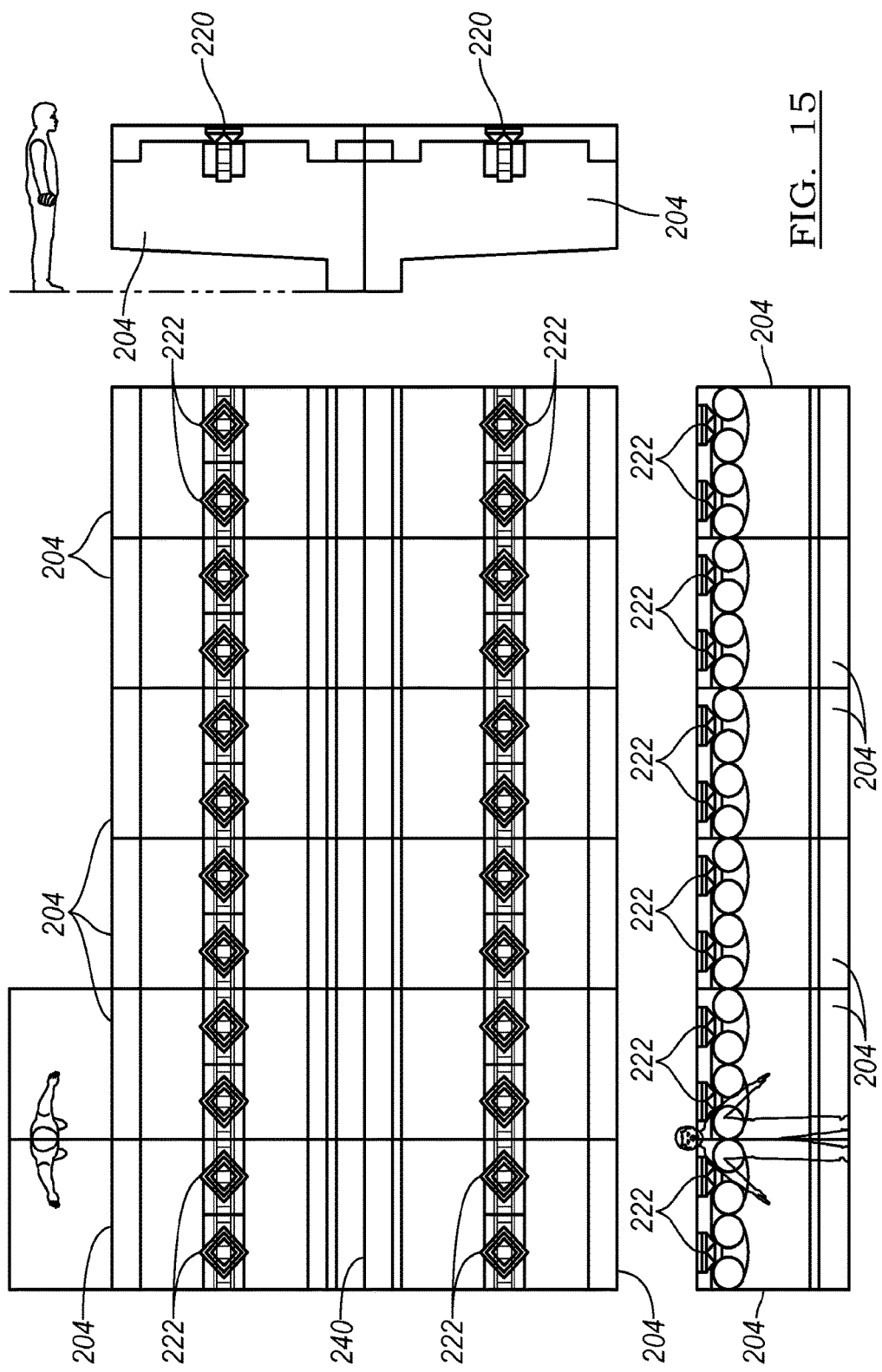
FIG. 15 is a schematic view of another series of under section modules in accordance with principles of the present invention.
Figure 16:
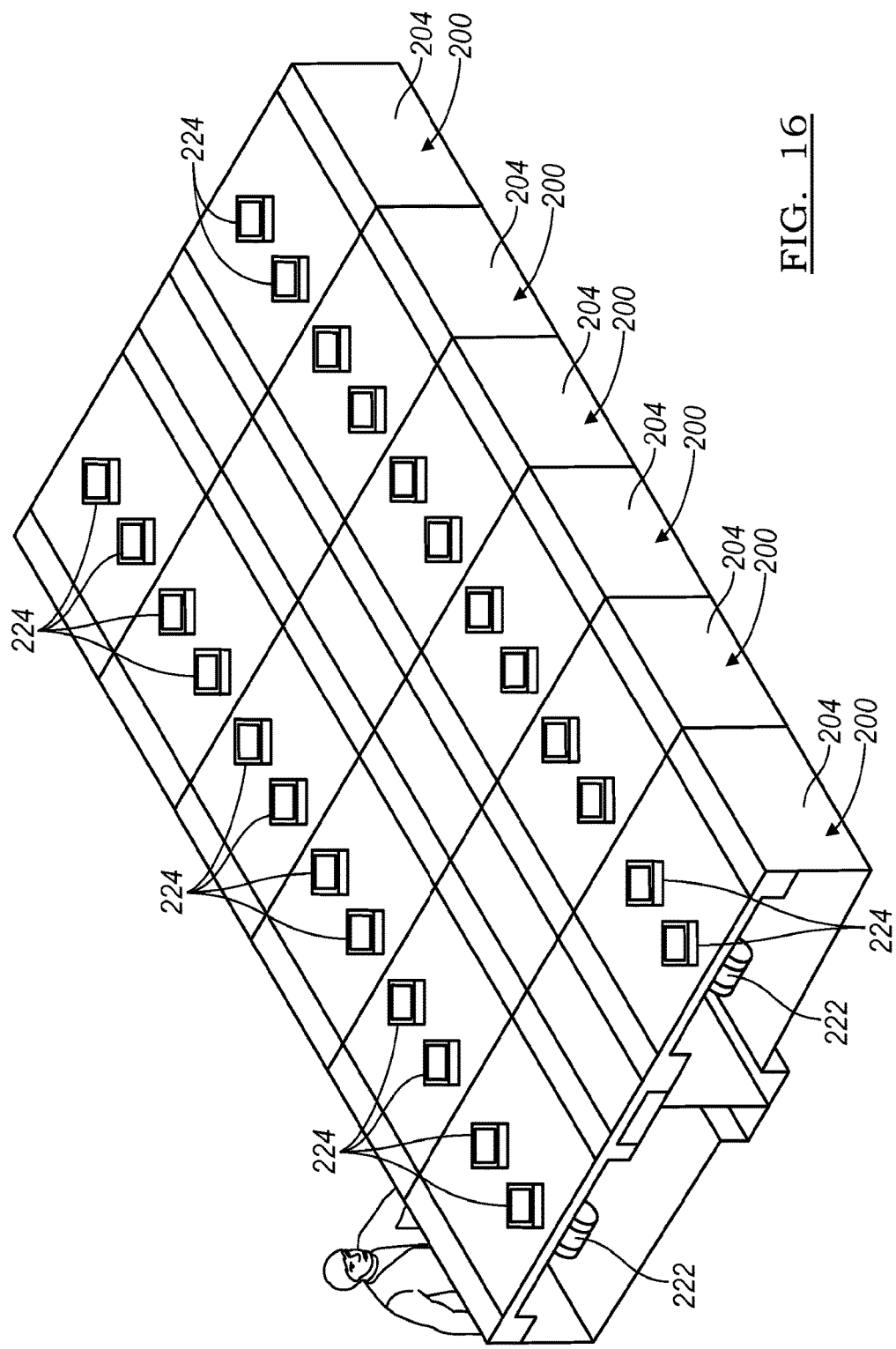
FIG. 16 is a perspective view of the series of under section modules generally seen in FIG. 15.

FIGS. 13 to 16 generally illustrate how the under sections 204 of a series of spray booth modules 200 can be positioned and repeated to form a spray booth of any desired length. As seen schematically in FIG. 13 and in perspective in FIG. 14, the under sections 204 of the embodiment shown in FIG. 11 or 12 are provided via a series of six modules. FIGS. 15 and 16 differ from FIGS. 13 and 14 in that the wet scrubbers 222, as evidenced by their inlets 224, of each under section 204 (only some of which are identified) are positioned longitudinally adjacent to one another, instead of laterally adjacent to one another. Such a variation could be incorporated into the under sections 204 of FIG. 12. As a further variant, which could be applied across any of the discussed under sections 204, the sloped upper wall section 234 is omitted in the under sections 204 of FIGS. 13 to 15. FIG. 17 presents a side-by-side comparison of the under sections 204 of FIGS. 13 and 15.

The embodiments described above were chosen to provide the best application to thereby enable one of ordinary skill in the art to utilize the disclosed inventions in various embodiments and with various modifications as are suited to the particular use contemplated. All such modifications and variations are within the scope of the invention.

I claim:

1. A spray booth module comprising:
   a spraying section where a sprayed fluid is directed toward an object to be sprayed;
   a capturing section disposed below the spraying section and communicating with the spraying section and including at least one wet scrubber for capturing overspray of the sprayed fluid; and
   at least one under section, the at least one under section being a portion of the capturing section and having the at least one wet scrubber provided therein, the at least one wet scrubber being located beneath an area where the over spray is generated;
   wherein the at least one under section includes walls, a sloped floor, and a sluice, wherein the walls and sloped floor define and operate as a plenum for directing air to an exhaust fan assembly;
   wherein the sloped floor is positioned below and adjacent an exhaust of the at least one wet scrubber, the sloped floor directing water from the exhaust toward the sluice;
   wherein the at least one under section comprises two under sections and each of the two under sections includes a plurality of wet scrubbers; and
   wherein each of the two under sections includes a dedicated exit opening connected to an exhaust fan assembly, and the sloped floor slopes downward from the exit opening to the sluice, and wherein the sloped floors for each of the respective two under sections are sloped in opposite directions and toward each other.

2. The spray booth module according to claim 1, wherein the at least one wet scrubber is positioned in an area located laterally outward of the object to be sprayed.

3. The spray booth module according to claim 1, wherein the at least one wet scrubber includes an inlet, the inlet being positioned beneath an area located laterally outward of the object to be sprayed.

4. The spray booth module according to claim 1, wherein two wet scrubbers are provided for each of the two under sections of the spray booth module.

5. The spray booth module according to claim 1, wherein four wet scrubbers are provided for each of the two under sections of the spray booth module.

6. The spray booth module according to claim 1, wherein the at least one under section has a vertical height of less than 11 feet as measured from an inlet of the at least one wet scrubber and a bottom of the sloped floor.

7. The spray booth module according to claim 1, wherein the at least one under section has a vertical height of 5 feet or less as measured from an inlet of the at least one wet scrubber and a bottom of the sloped floor.

8. The spray booth module according to claim 1, wherein the plurality of wet scrubbers are positioned laterally symmetrical on opposing sides of the spray booth module.

9. The spray booth module according to claim 1, wherein each of the at least one wet scrubbers includes a vortex chamber.

10. The spray booth module according to claim 1, wherein each of the at least one wet scrubbers includes two vortex chambers, each of the vortex chambers being located on opposing sides of an inlet into the at least one wet scrubber.

11. The spray booth module according to claim 1, wherein a side wall of the at least one under section includes a sloped upper section, the sloped upper section disposed above the sluice and sloped in the same direction as the sloped floor to facilitate a reversal of a flow of air from the exhaust of the at least one wet scrubber.

12. The spray booth module according to claim 1, wherein the at least one under section is provided without a baffled mist eliminator.

13. The spray booth module according to claim 1, wherein within each under section, each of the plurality of wet scrubbers include an exhaust, wherein the exhausts of each of the plurality of wet scrubbers extend in the same direction.

14. The spray booth module according to claim 1, wherein the at least one wet scrubber includes an exhaust extension, the exhaust extension extending and being sloped in the same direction as the sloped floor to reduce splash.

* * * * *